United States Patent [19]

Corry et al.

[11] 4,435,988

[45] Mar. 13, 1984

[54] APPARATUS FOR INDICATING CRITICAL TORQUE LOAD

[75] Inventors: Stuart E. Corry, Hallett; Lanny V. Grade, Oklahoma City, both of Okla.

[73] Assignee: The Geolograph Company, Oklahoma City, Okla.

[21] Appl. No.: 282,966

[22] Filed: Jul. 13, 1981

[51] Int. Cl.³ ............................................. G01L 3/14
[52] U.S. Cl. ............................. 73/862.19; 73/862.31; 73/862.49
[58] Field of Search ........... 73/862.19, 862.31, 862.37, 73/862.49

[56] References Cited

U.S. PATENT DOCUMENTS

| | | | |
|---|---|---|---|
| 389,928 | 9/1888 | Hurdle et al. | 73/862.19 X |
| 2,783,645 | 3/1957 | Hornbostel | 73/862.31 |
| 3,108,471 | 10/1963 | Buchele et al. | 73/862.19 |
| 3,295,367 | 1/1967 | Rundell | 73/862.34 |
| 3,664,474 | 5/1972 | Blake et al. | 73/862.19 X |
| 3,668,926 | 6/1972 | Bell | 73/862.19 |
| 3,946,603 | 3/1976 | Houvouras | 73/862.19 |

FOREIGN PATENT DOCUMENTS

| | | | |
|---|---|---|---|
| 845271 | 7/1952 | Fed. Rep. of Germany | 73/862.19 |
| 427243 | 9/1948 | Italy | 73/862.19 |
| 174726 | 1/1922 | United Kingdom | 73/862.19 |

*Primary Examiner*—Charles A. Ruehl
*Attorney, Agent, or Firm*—William S. Dorman

[57] ABSTRACT

An apparatus for indicating critical torque load in a drill string of a propeller shaft driven rotary drilling machine comprising an input and an output section in axial alignment and drivingly connected so as to rotate conjointly; the input section has an input shaft and a spiral spline affixed thereto; the output section has a tube shaft assembly and an output shaft affixed thereto; an input bearing is provided for rotatably supporting the input shaft and allowing for longitudinal movement of the input shaft toward the output section under conditions of increased torque load; an input housing for receiving the input bearing is affixed to a base; a receiver nut having a complementary female spiral spline is a companion for the spiral spline and is operatively connected to the spiral spline to permit longitudinal movement of the input shaft toward the output section under conditions of increased torque load; a compression spring prevents longitudinal movement of the input shaft under conditions of constant torque load; a rotatably fixed collar mounted on the input shaft indicates longitudinal movement of the input shaft; a bearing support and housing for the output section is attached to the base; an input yoke connects the input section to an external power source; and an output yoke connects the output section to a rotary table connected to the drill string; and a load cell is connected to the collar to sense the degree of movement or the force produced under conditions of increased torque.

1 Claim, 8 Drawing Figures

APPARATUS FOR INDICATING CRITICAL TORQUE LOAD

BACKGROUND OF THE INVENTION

1. Field of the Invention

The present invention relates to an apparatus or device which indicates torque load in an operating propeller shaft driven machine. More particularly, the present invention relates to a device employed to accurately measure the increased torque load along the drill string of an oil well drilling rig.

2. Prior Art

Most oil well and water well drilling machines or rigs are provided with a rotary table. The rotary table is attached to a section of pipe called a "Kelley", which in turn is connected to the drill string in the well bore. The rotary table rotates the Kelley thus rotating the boring bit. There are two methods of turning the rotary table, the first method being a chain driven rotary table and the second method being a rotating shaft connected directly to the rotary table through suitable gearing, etc. The rotating shaft drive is commonly referred to herein as a propeller shaft drive.

Hazards can occur during the drilling process such as the drill bit encountering a stratum of hard rock or having the sides of the well hole collapse inwardly on the drill string. These various hazards can impede the rotation of the drill string thus locking it from turning. If continued power is applied to the rotary table, a twisting off of the Kelley from the drill string can occur, which requires a costly reinstitution of the drilling operation. Therefore, the purpose of a torque indicator is to prevent a costly "twist-off" and to provide a continuous visual and permanent record of the delivered torque load in the propeller shaft drive.

Torque indicators used on certain oil well drilling rigs are well known in the prior art. The prior art torque indicators for rotary drilling are applied to a chain driven rotary table wherein a movable idler is placed on the power side of the chain drive in a position to deflect the straight line of the drive between drive and driven sprockets. As the torque increases and tightens the chain, the deflection of the imposed idler is proportional to the torque load and is recorded as such on an indicator. However, the aforementioned torque indicator is not applicable to a propeller shaft driven rotary table.

One prior art patent, U.S. Pat. No. 4,193,720 to Machida, discloses a critical torque indicator having input and output members which are connected so as to rotate conjointly whenever the torsional resistance is lower than a set critical value. Upon the occurrence of a greater torque, the output member will delay in rotation as compared to the input member, wherein the difference in their rotational speed is taken out as a signal to detect critical torque. However, the Machida patent was designed for us with a machine tool drill and is not applicable for use with a propeller shaft driven rotary table.

No prior art device incorporates splined ends on its input and output members. No prior art discloses the use of a chamber which is provided with an internal compression spring to impede longitudinal movement of the input member during normal operation. No prior art uses longitudinal movement of the input member as the measure of critical torque load.

SUMMARY OF THE INVENTION

The present invention provides the drilling operator of a propeller shaft driven machine with an accurate indication of the true increased torque load as it builds up to a recommended limit. The above information allows the operator to reduce or disengage power to the rotary table and thus take alternate steps to prevent a costly twist off. The present invention also provides a hydraulic modification of the apparatus by which an increased torque load is indicated by a pressure signal.

The apparatus of the present invention is an independent unit or section which can be readily installed into any appropriate capacity propeller shaft drive line that has been modified to receive it. The present invention can also be installed into any newly designed device for this purpose using "off-shelf" standard propeller shaft parts for its attachment. Each end of the device of the present invention has standard fittings for off-shelf drive line parts.

The apparatus of the present invention is comprised of an input section and an output section which are drivingly connected so as to rotate conjointly thus delivering a constant torque. The first or input section comprises an input shaft having a 45° spiral spline or male screw on its output end and a straight spline on its input end. A universal joint yoke is attached to the straight spline. The universal joint yoke acts an an input yoke and is attached at its input end to a standard drive line slip yoke. The input shaft is supported by a bearing received within a bearing housing which is affixed to a base. The fit up of the bearing to the input shaft is a close tolerance slip fit allowing the shaft to freely slide longitudinally through the bearing.

An annular groove is recessed into the input shaft adjacent to the point on the input shaft where the spiral spline is attached. A split trunion collar is received in the annular groove and is restrained from rotating by means of a yoke or similar retainer. The trunion collar is free to move longitudinally with the input shaft.

The second or output section of the present invention is comprised of a tube shaft assembly and receiver nut which are integrated into a unit by welding. The receiver nut is provided with a 45° spiral spline or female screw and is a companion for the spiral spline on the input shaft. The spiral spline and the receiver nut are assembled so that their entrance and exit ends are flush. The tube shaft assembly includes a tube shaft and an end plate or cap. The output tube shaft is supported by bearings received in an output bearing housing. The bearing housing is firmly attached to the base by bolts which are of sufficient strength to resist maximum torque. A yoke is connected to the output section by means of a nut and washer which are fitted to an output spline, the latter being an integral part of the tube shaft assembly. The output section also includes an output yoke which is attached to the output end of the output spline.

A chamber is formed within the tube shaft running longitudinally between the input shaft and the end cap. A compression spring is received within the chamber and is centered on the input shaft by means of a pilot affixed to the output end of the spiral spline and by another pilot affixed to the end cap. A thrust bearing is also carried on the output end of the spiral spline and is held in place by means of the compression spring.

After the above parts have been assembled as described, the rotation of the input yoke delivers torque power through the input shaft and spiral spline to the receiver nut and the tube shaft. Under normal torque load, the spiral spline is held in positive relation to the receiver nut by the resistance of the spring. The spring is of sufficient strength to resist the screwing action between the spiral spline and the receiver nut. When the ouptut yoke is refrained from turning to any degree by the rotary table torque requirements; the longitudinal screwing action of the spiral spline into the receiver nut overcomes the resistance of the spring in proportion to the torque restraint. The action is caused by the inclined planes (of one spiral spline) working against the other inclined planes (of the other spiral spline). The longitudinal motion of the spiral spline toward the output end of the apparatus will move the trunion collar the same distance. The distance the trunion collar moves is proportional to the torque resistance imposed on the output end yoke. The displacement of the collar can be transmitted and calibrated by various methods, such as a hydraulic cylinder, to deliver an analog or digital figure that represents the true output torque.

The hydraulic modification of the present invention also comprises an input section and an output section that interlock for proper delivery of constant torque. The input section of the hydraulic modification is similar to the aforementioned input section of the present invention; in that, it comprises an input shaft and a 45° spiral spline or screw. The input shaft is supported by a bearing which is received in a cylinder housing which is attached to a casing. The fit up of the bearing to the shaft is a close tolerance slip fit thus allowing the bearing to freely slide longitudinally over the input shaft. The housing is also provided with a hydraulic chamber or "cylinder" into which is received a piston.

The output section of the hydraulic modification is comprised of an output shaft and a receiver nut which are connected by a straight sliding spline. The receiver nut is a companion for the spiral spline; and the receiver nut and the spiral spline are assembled so that their entrance and exit ends are flush. The output shaft is supported by two bearings which are received into an output bearing housing. The bearing housing is firmly attached to the casing which is subsequently attached to a base of sufficient strength to resist maximum torque.

The input shaft bearing transmits thrust from the receiver nut to the piston (which is included in the input section of the hydraulic version) compressing the fluid in the related cylinder. The cylinder can be used to actuate a bourdon tube on an appropriately calibrated gauge with a dial in units of torque.

After the above parts have been assembled as described, the rotation of the input shaft (which is attached to a standard drive line yoke) delivers torque power through the input shaft and spiral spline to the receiver nut. The spline is held stationary by a thrust bearing which resists the longitudinal force between the spiral spline and the receiver nut. The thrust bearing is located between the piston and the receiver nut. When the output shaft is refrained from turning to any degree by the rotary table requirements, the longitudinal screwing of the spiral spline into the receiver nut causes the same to slip at its output end thus producing hydraulic pressure by forcing the piston into the cylinder in proportion to the torque restraint. The longitudinal motion of the receiver nut toward the input end will only be enough to actuate the pressure sensing element. The pressure signal can be used by an indicating gauge, hydraulic recorder or an electric transducer.

In a still further embodiment of the present invention, the input and output sections, principally the male and female splined portions thereof, are replaced by a cam-type torque translator, one portion of which corresponds to the input section and the other portion of which corresponds to the output section, previously described. This cam-type torque translator allows relative longitudinal movement between the input section and the output section by virtue of a plurality of intermating inclined planes on the opposed surfaces of the two sections. In effect, this cam-type torque translator is similar to a jaw clutch which is run in reverse fashion. Each of the sections is provided with a plurality of arcuate grooves in the inclined planes and a plurality of ball bearings are mounted in each of the grooves. One section is axially immovable with respect to its shaft and the other section is connected to its associated shaft by means of a straight spline whereby it can slide longitudinally with respect to its associated shaft. A hydraulic load cell biases the axially movable section against the axially immovable section. As the torque load increases, the axially movable section will tend to move away from the axially immovable section and hence produce an increased load on the hydraulic load cell which, in turn, is an indication of the increased torque.

DETAILED DESCRIPTION OF THE PREFERRED EMBODIMENTS

Figure 1:
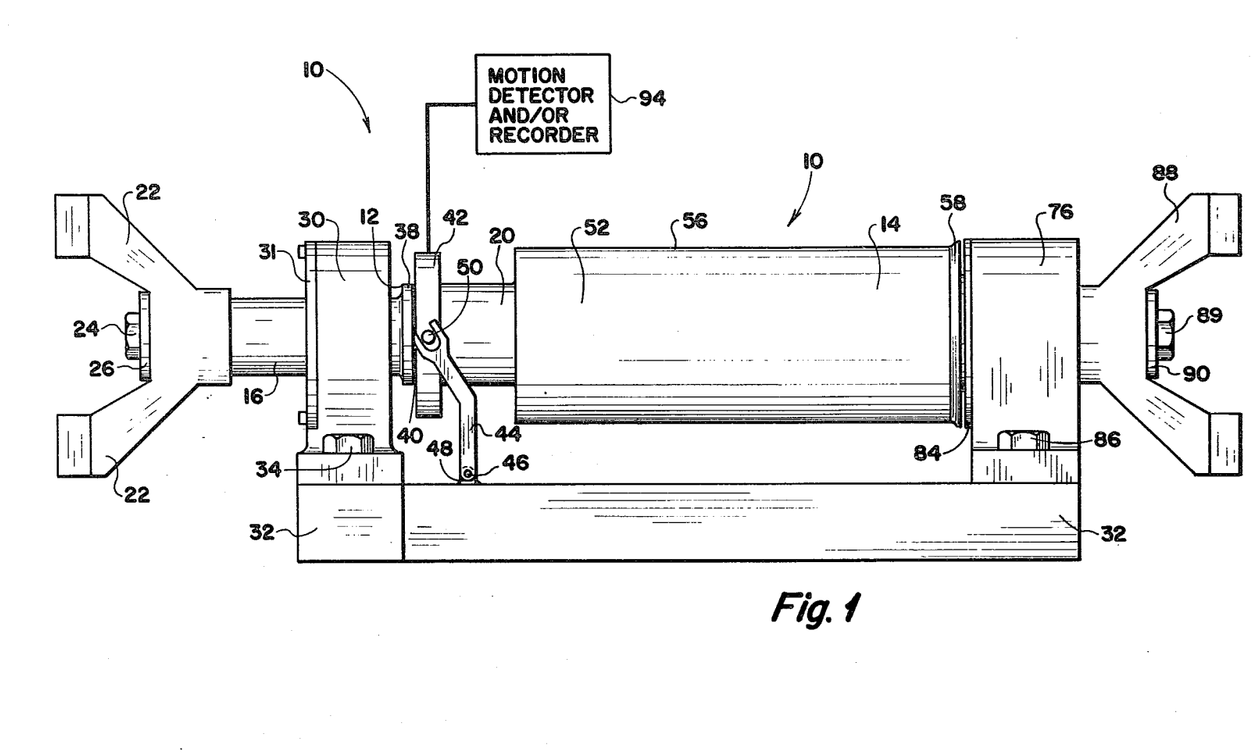
FIG. 1 is an elevational view of the torque indicating apparatus of the present invention.
Figure 2:
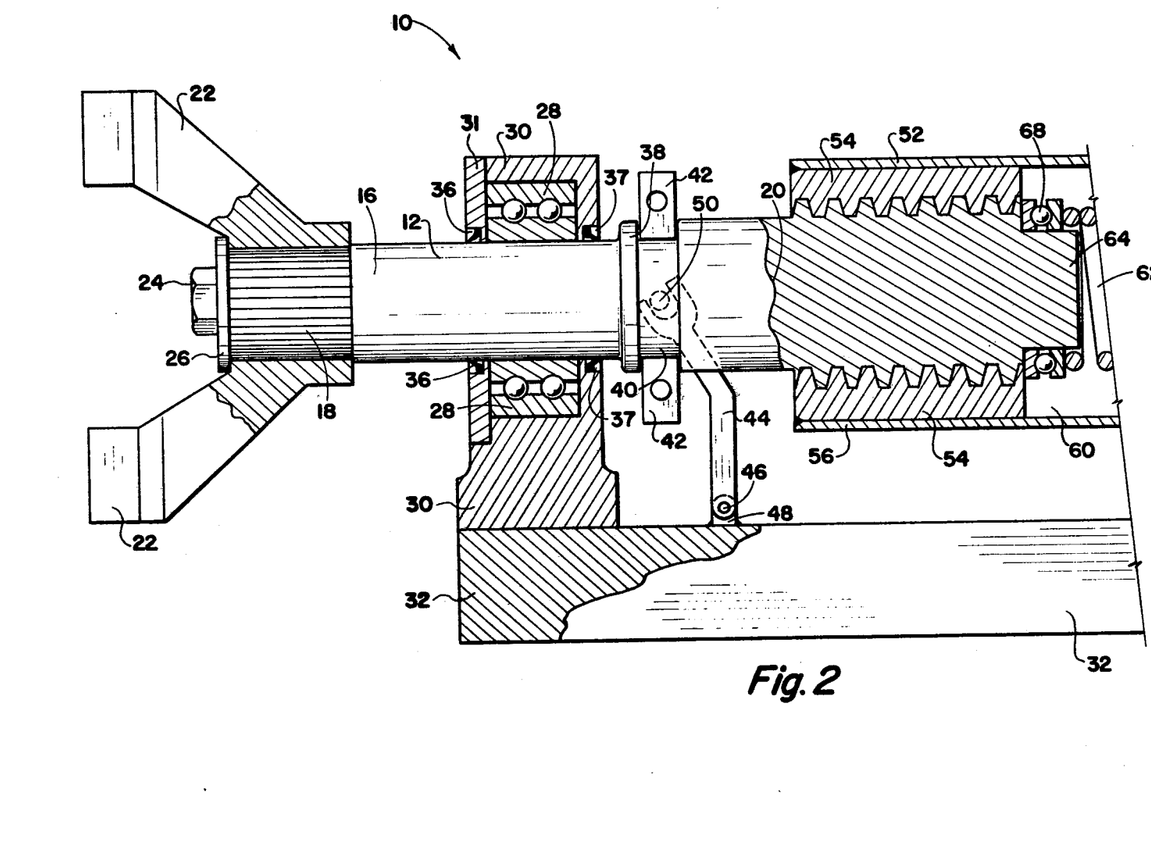
FIG. 2 shows the input section of the present invention having certain portions cut away to show greater detail.
Figure 3:
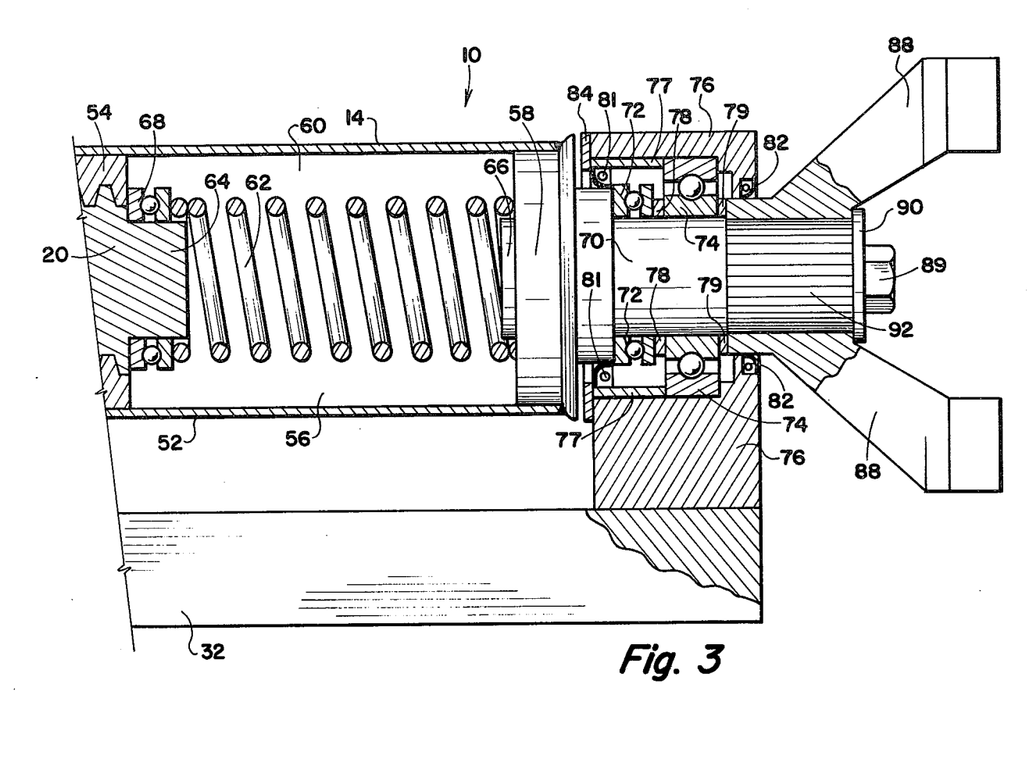
FIG. 3 shows the output section of the present invention having certain portions cut away to show greater detail.

Referring to the drawings in detail, FIGS. 1, 2 and 3 show a device or apparatus 10 to measure the torsional resistant force or critical torque load in the propeller shaft drive to the rotary table of an oil well drilling machine. As heretofore described, a rotary table (not shown) is attached to a section of pipe called a "Kelley" which in turn is connected to the drill string in the well bore. The present invention comprises an input section 12 and an output section 14 which are in axial alignment and drivingly connected so as to rotate conjointly thus delivering a normally constant torque from an external power source (not shown).

Referring to FIGS. 1 and 2, the input section 12 comprises an input shaft 16 having a straight input yoke spline 18 on its input end and a 45° spiral spline or screw 20 on its output end. A universal joint yoke 22 is attached to the straight spline 18 by means of a nut 24 and a washer 26. The universal joint yoke 22 acts as an input yoke and is attached at its input end to a standard drive line slip yoke (not shown).

The input shaft 16 is held in place and rotatably supported by an input bearing 28 received in an input bearing housing 30. The bearing housing 30 is provided with a housing cover 31, and is affixed to a base 32 by means of bolts 34 (only one of which is shown in FIG. 1). A set of pressure seals 36 and 37 are installed circumferentially around input shaft 16 along both sides of bearing housing 30 to provide an oil tight seal for the bearing 28. The fit up of bearing 28 to input shaft 16 is a close tolerance slip fit, thus allowing the shaft 16 to freely slide longitudinally through the bearing 28.

Adjacent to the bearing housing 30, the diameter of the input shaft 16 is increased to the diameter of the base 38 of the spiral spline 20. An annular groove 40 is recessed into the input shaft 16 adjacent the base 38 of the spiral spline 20. A split trunion collar 42 is received in annular groove 40 and is refrained from rotating with the input shaft 16 by means of a collar yoke or brace 44. The yoke 44 is pivotally attached at its lower end to base 32 by means of a pin 46. The pin 46 passes through suitable holes in the lower end of yoke 44 and in a tab or eye 48 which is affixed to the base 32. The trunion collar 42 is provided with trunion pins 50 (only one of which is shown) which extended radially outwardly in opposite directions from the collar. The upper end of the yoke 44 is attached to the trunion collar 42 by means of the trunion pins 50. The collar, therefore, is free to move longitudinally with the input shaft 16.

Referring again to FIGS. 1, 2 and 3, the second or output section 14 of the present invention comprises a tube shaft assembly 52 and a receiver nut 54 which are integrated into a unit by means of welding or the like. The tube shaft assembly 52 includes a tube shaft 56 and an end plate or cap 58. The receiver nut 54 is a companion for the spiral spline 20 and fills the space between spline 20 and the interior side of tube shaft 56. These parts are assembled so that the entrance and exit ends of spiral spline 20 and receiver nut 54 are flush initially.

A chamber 60 is formed within the tube shaft and runs longitudinally between the input shaft 16 and the cap 58. A compression spring 62 is received within chamber 60 and is centered and held in position by means of a first spring pilot 64 affixed to the output end of the spiral spline 20, and by means of a second spring pilot 66 which is affixed to the interior side of the cap 58. A thrust bearing 68 is seated around the first pilot 64 and is retained by compression spring 62. The spring chamber 60 is preferably filled with oil.

The tube shaft assembly 52 is attached to an output shaft 70 which is held in place and supported rotatably by a thrust bearing 72 and an output bearing 74. Thrust bearing 72 and output bearing 74 are received in an output bearing housing 76 and are provided with spacers 77, 78 and 79, as shown in FIG. 3. A set of pressure seals 81 and 82 are installed circumferentially around output shaft 70 along both sides of the bearing housing 76 thus providing an oil tight seal. A retainer collar 84 is attached to housing 76 to hold bearings 72 and 74 in place. The bearing housing 76 is firmly attached to base 32 by bolts 86 (one of which is shown) which are of sufficient strength to resist maximum torque. An output yoke 88 is connected to the output shaft 70 and is locked in place by means of a nut 89 and a washer 90. The nut 89 and washer 90 are fitted to an output spline 92 which is an integral part of the tube shaft assembly 52. The output yoke 88 is connected at its output end to the rotary table (not shown) in the conventional manner for drives of this type.

After the above parts have been assembled as described, the rotation of the input yoke 22 will deliver torque power from an external source (not shown) through the input shaft 16 and spiral spline 20 to the receiver nut 54 and the tube shaft 56, which subsequently causes the output shaft 70 to rotate conjointly. The rotation of output shaft 70 rotates output yoke 88 which turns the rotary table subsequently turning the drill string under normal torque load. The spiral spline 20 and the receiver nut 54 are held in an interlocked position as shown in FIG. 2 by the resistance of the compression spring 62 under normal torque conditions. The spring 62 is of sufficient strength to resist the screwing action between spiral spline 20 and the receiver nut 54.

Critical torque of a magnitude greater than the input torque force is created in the propeller shaft drive when the output yoke 88 is restrained from turning to any degree by the rotary table torque requirements. Upon the occurrence of excessive torque, the longitudinal screwing action (to the right as it appears in FIG. 3) by the spiral spline 20 into the receiver nut 54 overcomes the resistance of spring 62 in proportion to the torque restraint. As a result of this longitudinal (rightward) motion of the spiral spline toward the output end 14 of the apparatus 10, the input shaft 16 also moves toward the right (in relation to the drawings) in the direction of the output section 14 along its longitudinal axis thus displacing the trunion collar 42 a distance directly proportional to the amount of increased torque load. A motion detector and/or recorder, indicated diagrammatically by reference numeral 94, can be connected directly to trunion collar 42 to transmit and calibrate the displacement of the collar. The detector/recorder 94 can include a solenoid (not shown), a hydraulic cylinder (not shown) or any other mechanical or electrical means capable of providing an analog or digital readout that measures the true output torque.

Figure 4:
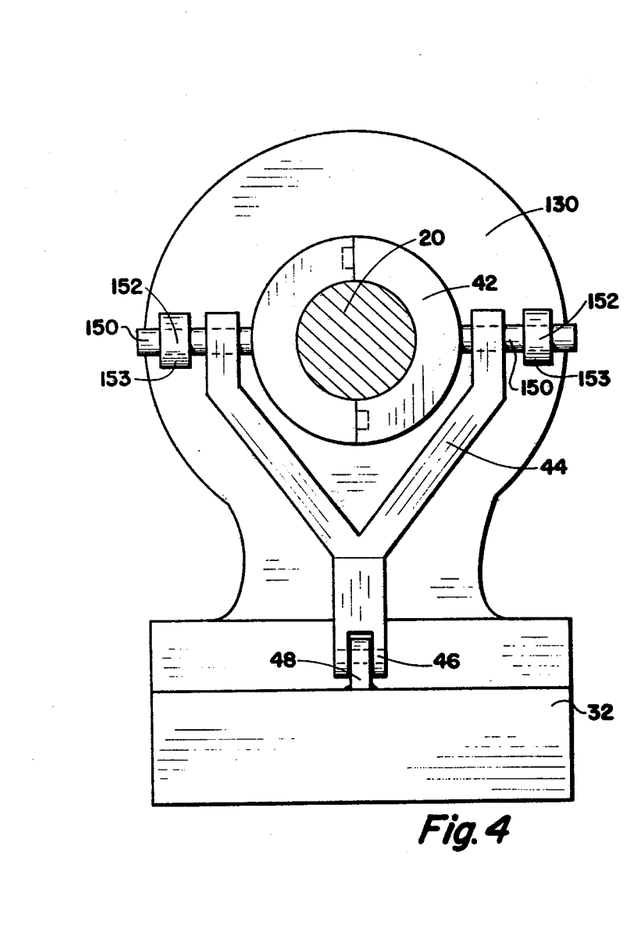
FIG. 4 is a side elevational view showing an alternate arrangement of the torque indicating element.
Figure 5:
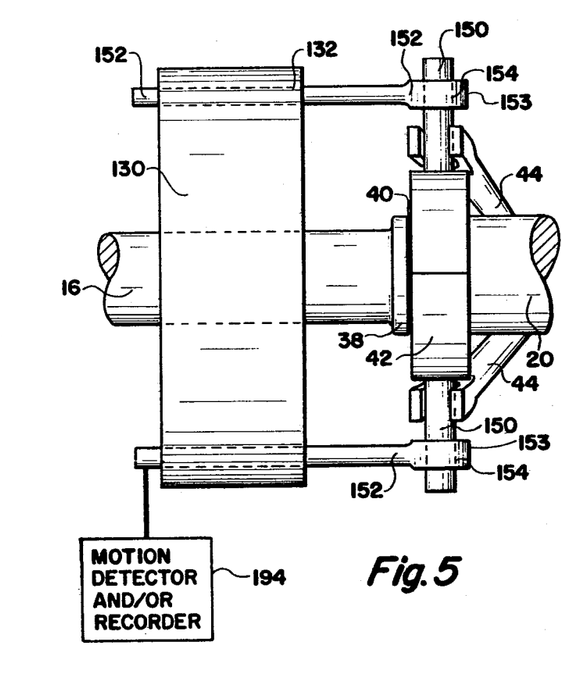
FIG. 5 is a top plan view of the elements shown in FIG. 4.

FIGS. 4 and 5 show an alternate arrangement of sensing the movement or displacement of the trunion collar 42. The yoke 44 is connected to the collar 42 and is pivotally connected to the base 32 in the same manner as above described in relation to FIGS. 1 and 2. Similar trunion pins 150, which are somewhat longer than the corresponding trunion pins 50 shown in FIGS. 1 and 2, extend outwardly from the sides of the yoke 44 in order to accommodate a pair of slide links 152. The enlarged round ends 153 of the slide links 152 are provided with openings 154 so as to be received over the ends of trunion pins 150. Slide links 152 extend rearwardly (toward the input end of the apparatus) through holes 132 in the input bearing housing 130.

A rightward longitudinal displacement (toward the output end of the apparatus) of the trunion collar 42, caused by a critical torque load as described above, will cause the slide links 152 to move a corresponding distance parallel to the input shaft 16. As shown in FIG. 5, the links 152 extend rearwardly from the holes 132 in housing 130, and thus, provide a means for connection to a detector/recorder 194 which is similar to detector/recorder 94 described above.

Figure 6:
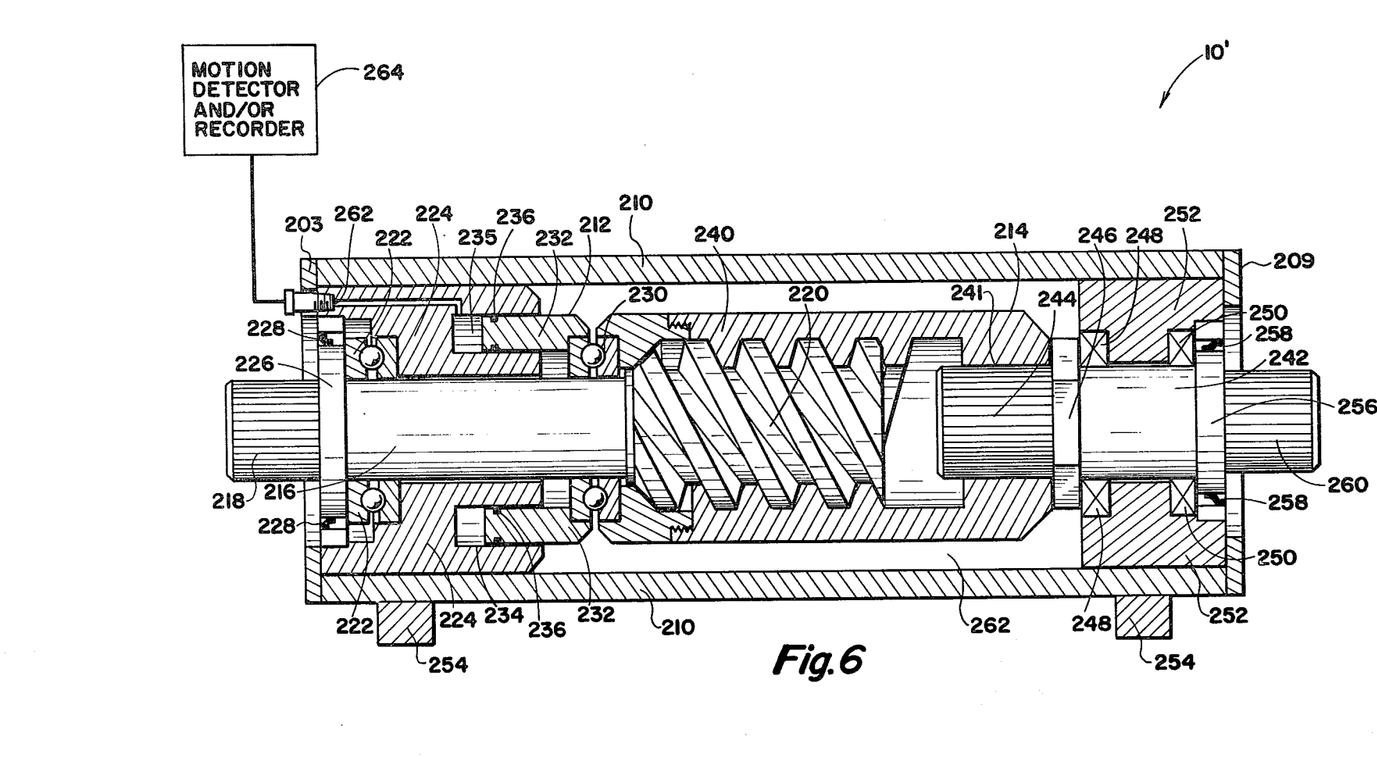
FIG. 6 is an elevational view of the hydraulic modification of the present invention.

FIG. 6 of the drawings shows a hydraulic modification 10' of the apparatus of the present invention whereby the critical torque load developed in the propeller shaft drive to the rotary table of an oil well rotary drilling machine is measured by means of a built-in hydraulic output torque sensor. The hydraulic modification 10' comprises an input section 212 and an output section 214' which are drivingly connected so as to rotate conjointly thus delivering a constant torque force. Input section 212 and output 214 are contained within a main body housing or casing 210. Casing 210 is provided with an input end plate 208 and an output end plate 209.

The input section 212 is similar to the aforementioned input section 12 and comprises an input shaft 216 having a straight input yoke spline 218 on its input end and a 45° spiral spline or screw 220 on its output end. Straight spline 218 is connected to an external power source (not shown) by means of a standard drive line yoke (not shown), which is similar to the aforementioned input yoke 22. The above external power source provides for normal rotation of the input shaft 216.

The input shaft 216 is held in place and supported rotatably by an input bearing 222. A hydraulic cylinder housing 224 (to be disclosed in greater detail hereinafter) acts as a bearing housing for bearing 222 and is affixed to the interior input end of the main body casing 210. A collar 226 is received on the input shaft 216 and fits against the bearing 222. The collar 226 provides resistance for bearing 222 of the longitudinal force between the input section 212 and the output section 214. A pressure seal 228 is seated circumferentially around collar 226 thus providing an oil tight seal for the bearing 222.

Input shaft 216 is also supported rotatably by a thrust bearing 230 located adjacent to the spiral spline 220 and which is attached at its input end to a hollow or annular piston 232 (which will be disclosed in greater detail hereinafter). The fit up of thrust bearing 230 to the input shaft 216 is a close tolerance slip fit thus allowing the bearing 230 to freely slide longitudinally over the input shaft. The piston 232 is received within an annular chamber or cavity 234 in housing 224. For the sake of simplicity and to conform to the customary "piston-cylinder" terminology, the chamber 234 will sometimes hereinafter be referred to as a "cylinder". Cylinder 234 is filled with hydraulic fluid 235. Piston 232 is provided with a set of O-rings 236 to prevent any accidental leaking at the hydraulic fluid 235.

The output section 214 comprises a receiver nut 240 and an output shaft 242 which are connected by a straight sliding spline 244 which is integral with shaft 242. The receiver nut 240 is grooved at its output end 241 so as to slide onto the straight spline 244. The receiver nut 240 is a companion for the spiral spline 220; and the receiver nut and the spiral spline are assembled so that their entrance and exit ends are flush.

The output shaft 242 is held in place and is supported rotatably by bearings 248 and 250. Bearings 248 and 250 are received in a bearing housing 252 adjacent to the nut 246. The bearing housing 252 is affixed to the main body casing 210 which is subsequently connected to a base 254 by means of bolts (not shown) which are sized to resist maximum torque. The output shaft 242 is also provided with a collar 256 and an oil tight pressure seal 258 which is installed circumferentially around the collar 256. The nut 246 holds the bearings 248 and 250 in position with respect to the collar 256. As shown, a straight output spline 260 is connected to the output shaft 242 and extends beyond the main body casing 210. Straight spline 260 is connected to a standard drive line yoke (not shown) which is similar to the aforementioned output yoke 88. The body cavity 262 of apparatus 10' is filled with lubricating oil.

After the above parts have been assembled as described, the rotation of input shaft 216 will deliver torque power, from an external power source (not shown), through the spiral spline 220, which is interlocked with the receiver nut 240, to the output shaft 242 thus causing shaft 242 to rotate conjointly. As shown in FIG. 6, thrust bearing 230 separates the receiver nut 240 from the hydraulic piston 232. During a drilling operation, when output shaft 242 is subjected to critical torque, the receiver nut 220 at its output end 241 will slip on straight spline 244, thereby accomplishing the function of a standard drive line slip yoke. The above action urges the spiral spline 220 in a longitudinal direction towards the input end of apparatus 10' (to the left in the drawing). This longitudinal movement of spline 220 and its interlocked receiver nut 240 causes the thrust bearing 230 to drive the piston 232 (towards the left) into the cylinder or chamber 234, forcing the pressurized hydraulic fluid out of the cylinder 234 into an orifice 262 to operate a detector/recorder 264 which is similar to the aforementioned detector/recorders 94 and 194. The longitudinal motion of the receiver nut 240 toward the input end will be only enough to actuate a pressure signal which will be sufficient to operate the detector/recorder 264 referred to above.

Figure 7:
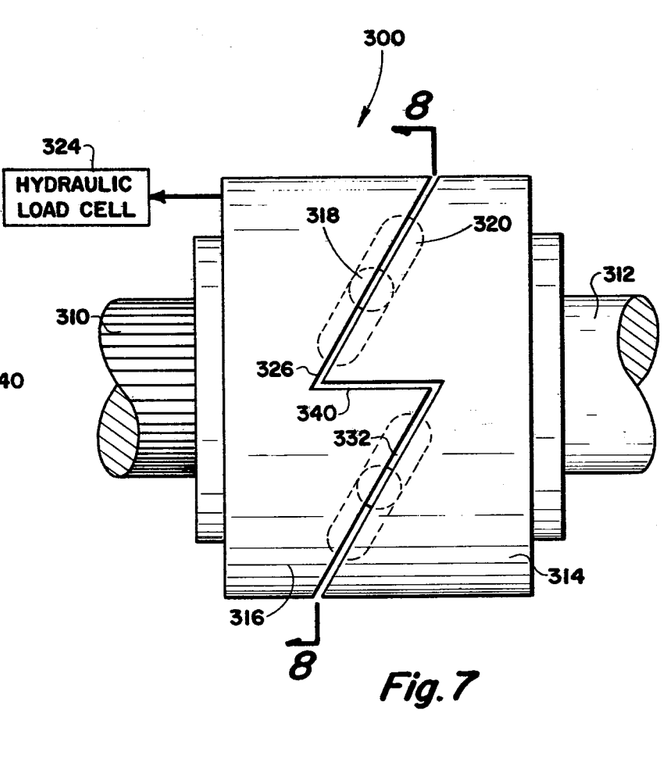
FIG. 7 shows a modification of the transitional zone between the input section and the output section of the present invention.
Figure 8:
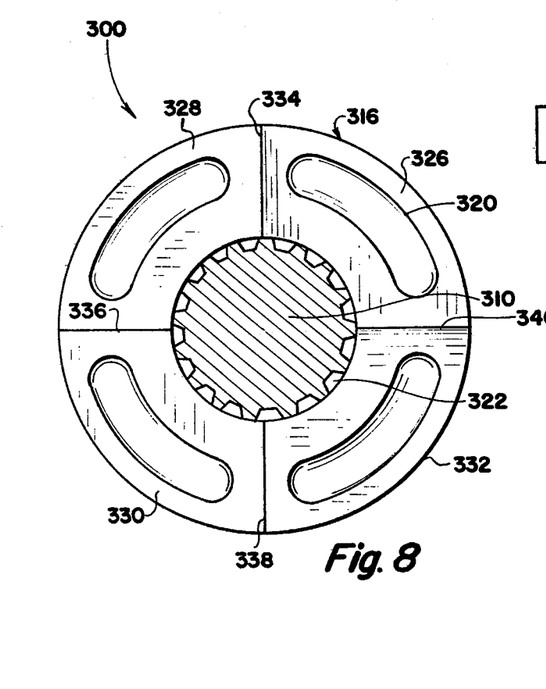
FIG. 8 is a cross-sectional view taken along section line 8—8 of FIG. 7.

FIGS. 7 and 8 show a modification of the input section and the output section of the invention as described in relation to FIGS. 1, 2, and 6. In this modification, there is a cam-type torque translator 300 which allows relative longitudinal (axial) movement between an input section 316 and an output section 314. The input section 316 is mounted on an input shaft 310 by means of a straight spline connection 322. On the other hand, the output section 314, is axially immovably mounted on an output shaft 312. The intermating surface of the input section 316 and the output section 314 are provided with inclined planes, as will be described presently. In reference to FIG. 8, which shows the surface configuration of input section 316, this member is formed by four inclined surfaces 326, 328, 330, and 332 separated by forwardly projecting teeth 334, 336, 338, and 340. Viewed from the side, as in FIG. 7, the above described arrangement looks like a circular saw tooth. The output section 314 is provided with surfaces and projections (not numbered) which are a mirror image of the surfaces and projections just described in relation to the input section 316. Each inclined plane (both sections) is provided with an arcuate groove or recess 320 in which a plurality of ball bearings 318 are received. The ball bearings are free to move circumferentially in the recessed grooves 320. A hydraulic load cell 324 is provided, not only to bias the input section 316 towards the right (as it appears in FIG. 7) and towards the output section 314, but also provides an indication of increased torque reflected back from the drill string when the input section 316 is urged towards the left as a result of this increased torque. The driving relationship between the input section 316 and the output section 314 is such that the intermating projections on the two members tend to separate. When the torque increases, the intermating projections tend to separate even more, thereby tending to move the input section 316 towards the left as it appears in FIG. 7. The principle of operation of the embodiment shown in FIGS. 7 and 8, however, is quite similar to that shown in FIGS. 1, 2, 3, and 6 in that relative axial movement of one member in relation to another is effected by means of two or more inclined planes interfacing with each other.

Whereas the present invention has been described in particular relation to the drawings attached hereto, it should be understood that other and further modifications, apart from those shown or suggested herein, may be made within the spirit and scope of this invention.

What is claimed is:

1. Apparatus for indicating torque load in a drill string of a shaft driven drilling machine of the type having a rotary table for rotating the drill string and wherein a shaft rotates the rotary table from an external rotary drive; comprising a torque indicating device having an input section adapted to be rotatably connected to the external rotary drive and an output section adapted to be rotatably connected to the rotary table, said input and output sections being disposed in axial alignment and being drivingly connected to each other so as to rotate conjointly, said input section having an input shaft adapted to be connected at a first longitudinal end thereof to the rotary drive and having a first coupling means mounted on a second longitudinal end of said input shaft; said output section having a second coupling means and an output shaft, said second coupling means being mounted on a first longitudinal end of said output shaft and said output shaft being adapted to be connected at a second longitudinal end to the rotary table, said first coupling means having a first spiral spline means thereon, said second coupling means having a second spiral spline means thereon complementary to said first spiral spline means, said first and second coupling means being connected to each other so as to be in driving relationship with each other through said spiral spline means, an input bearing being received in an input housing and rotatably supporting said input shaft, said input bearing allowing for axial movement of said input shaft toward said output section under increased torque load conditions, said second coupling means being axially immovable, resilient means preventing axial movement of said input shaft toward said output section under normal rotary driving conditions, and a sensing means for measuring the degree of axial movement of said input shaft; wherein said sensing means comprises a collar received in an annular groove recessed into said input shaft at a point adjacent said first coupling means, a pair of pins extending radially outwardly in opposite directions from said collar, a yoke for preventing said collar from rotating with said input shaft, said yoke being attached at its upper end to said pins and being pivotally attached at its lower end to a suitable base, and a pair of slide links being adapted to be received over the ends of said pins and extending rearwardly therefrom so as to be received in suitable holes in said input housing wherein said collar moves axially with said input shaft under increased torque load conditions thus causing said slide links to move a corresponding distance parallel to said input shaft.

* * * * *